Jan. 13, 1970   C. H. MESSERVEY ET AL   3,488,994
SORTING APPARATUS FOR CAN TESTERS
Filed Nov. 29, 1967   2 Sheets-Sheet 1
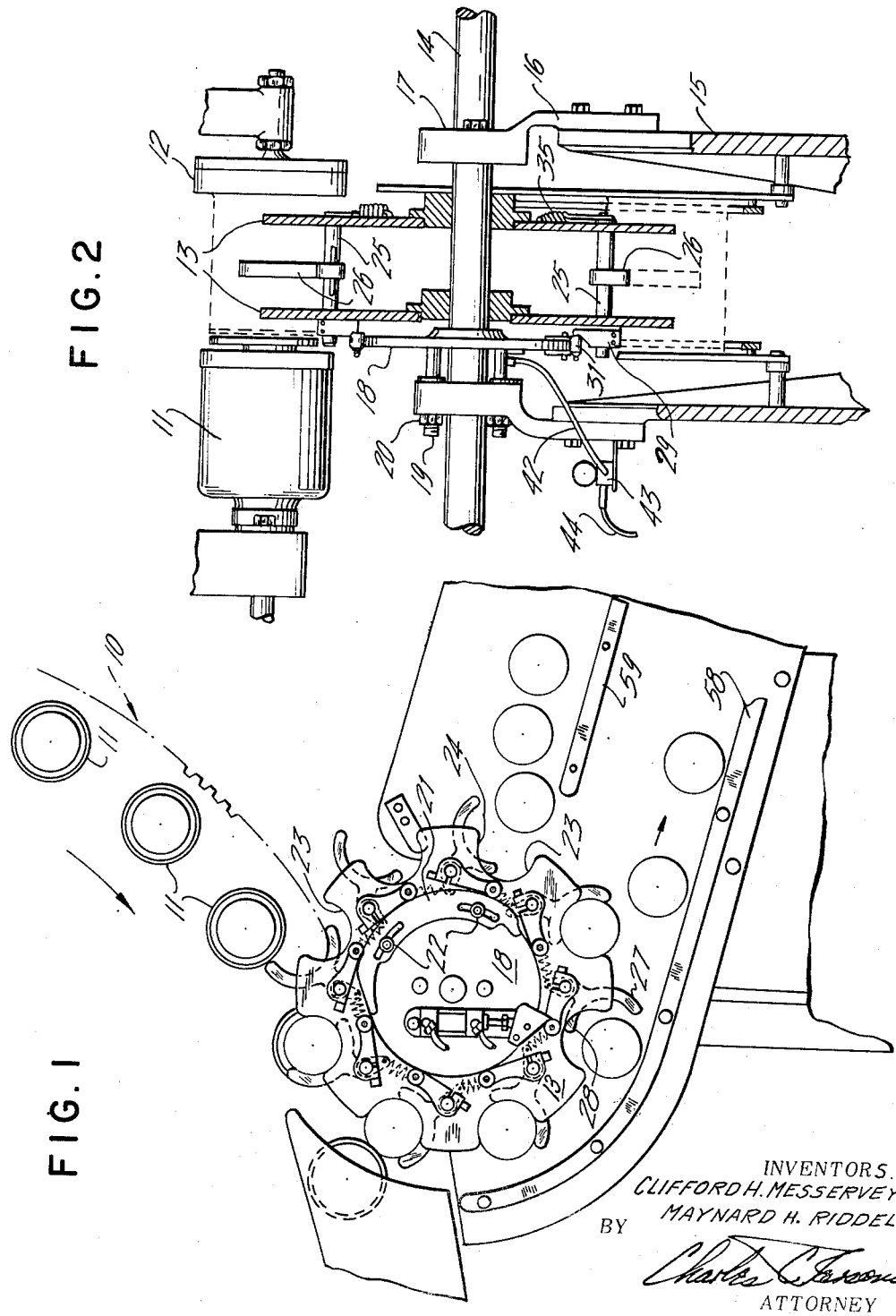
INVENTORS.
CLIFFORD H. MESSERVEY
MAYNARD H. RIDDELL
BY
Charles L. Parsons
ATTORNEY INVENTORS.
CLIFFORD H. MESSERVEY
MAYNARD H. RIDDELL
BY
Charles L. Parsons
ATTORNEY

United States Patent Office 3,488,994
Patented Jan. 13, 1970

3,488,994
SORTING APPARATUS FOR CAN TESTERS
Clifford Harry Messervey, East Randolph, and Maynard Harry Riddell, Randolph, N.Y., assignors to The Borden Company, New York, N.Y., a corporation of New Jersey
Filed Nov. 29, 1967, Ser. No. 686,616
Int. Cl. G01m 3/04
U.S. Cl. 73—45.2                 5 Claims

ABSTRACT OF THE DISCLOSURE

In a can testing apparatus for supplying cans to an apparatus, the cans are continuously moved into a testing region by a conveyor and gas is applied to the cans, any leaks being sensed and recorded. As the conveyor moves the cans from the testing region, they are maintained in spaced relation by a releasable retainer on the conveyor. The releasable retainer has a follower operatively engaged with a cam adjacent the conveyor so that movement of the follower over the length of the surface will actuate the retaining means to eject the cans from the conveyor. A piston mounted on the cam and responsive to the sensing and recording of a leak actuates the retainer.

Background of the invention

Heretofore, many apparatus and machines have been suggested for testing can bodies to determine whether or not the bodies are leak-proof. Examples of the various embodiments which have been used to carry out this function are the patents to Cameron, Patent No. 2,013,402, issued Sept. 3, 1935 and Patent No. 2,101,129 issued Dec. 7, 1937. These machines have for the most part proven satisfactory in testing cans by supplying air to a chamber in which the can is to be tested and measuring any change in pressure which occurs in the chamber due to leakage through the can walls. These machines additionally include various handling means to both supply the can to the testing portion and again in removing the can from the chamber and conveying it to the apparatus where the leaky cans are sorted from the good cans.

Conventionally, the sorting apparatus of the can tester has consisted of a star wheel having pivotal retaining fingers thereon which receive the cans from the conveying means and carry them in an arcuate path of travel. During this path of travel the good cans were allowed to drop by gravity from the star wheel and the leaky cans were carried up and wrenched or yanked from the star wheel by a stripping finger and then dropped by gravity into a separate chute. This prior art method of sorting cans has proven unsatisfactory in today's high speed operations because binding at the point of removal of the leaky can frequently occurs as greater production demands are made on the existing machinery. Moreover, the introduction of new materials in can making such as alloys and the like, as well as a trend toward reduction in the length of the can itself has resulted in a much lighter can which has presented an altogether new problem in handling during the sorting process. Consequently, there is a great need for a sorting apparatus which positively grasps the can for greater efficiency in handling and yet may quickly eject a leaky can without binding while operating at a high production level.

Summary of the invention

The present invention overcomes the heretofore set forth problems encountered in the testing of can bodies and has for its primary object a more efficient sorting apparatus which retains a greater degree of control over the cans being sorted and includes a positive discharge apparatus which quickly selects and rejects those leaky cans among the cans which have proven leak-proof.

Briefly stated, the present invention comprises a can tester having a means for supplying cans to the tester apparatus, means for moving the cans into a testing media, means for supplying a gas to the testing media, means for sensing and recording any gas leaks which occur in the cans being tested in the testing media, means to remove the cans from the testing media, means to convey the cans away from the testing apparatus, and releasable retaining means to maintain the cans on the conveying means in space relationship. The sorting apparatus of the present invention includes a cam adjacent the conveying means which is operatively associated with the releasable retaining means and which includes a positive discharge means mounted on the cam and responsive to the sensing and recording means whereby leaky cans are rejected from the conveying means.

Brief description of the drawings

The various features of the apparatus of this invention will become apparent from the following detailed description set forth in connection with the accompanying drawings which relate to the preferred embodiment of the present invention and are given by way of illustration.

FIGURE is a side perspective view of the instant invention.

FIGURE 2 is an end view of the present embodiment, partially sectioned to illustrate salient features thereof.

Detailed description of the invention

Figure 3:
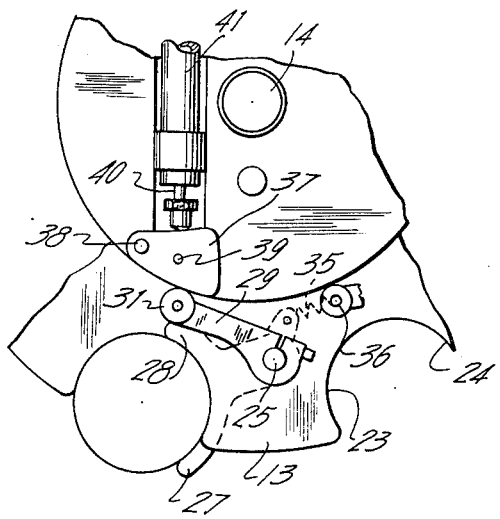
FIGURE 3 is a detailed description view of the discharge apparatus of the present invention.
Figure 4:
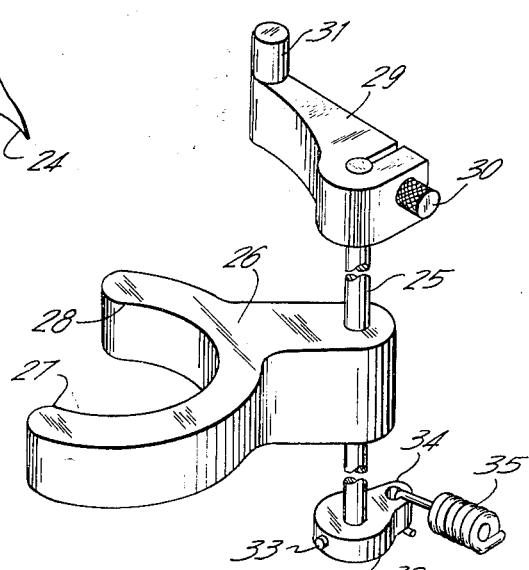
FIGURE 4 is an isometric perspective view illustrating the finger and follower assembly of the present invention.

Referring to the preferred embodiment of the sorting apparatus of the present invention, and more particularly to FIGURE 1 thereof, there is set forth a drive wheel 10 in which are provided various test chambers 11, each of which includes a closure cap 12 for hermetically sealing the test chamber when a can is received therein and tested under the influence of a gas media, as is more particularly set forth in the prior art and especially in Cameron U.S. Patent No. 2,013,402. Upon completion of the test, the cans are removed from the test chamber 11 and sorted as to their qualities, i.e., the leaky cans are to be rejected and the cans which are leak-proof are sent along the production line for receiving the contents to be placed therein.

The cans, upon removal from the test chamber 11, are received on a star wheel 13 which is fixedly attached to a rotatable axle 14. An upstanding U-shaped frame member 15 is provided to support the sorting apparatus of the present invention and includes journal mounting braces 16 at the upper end thereof, journals 17 being provided in each brace 16 and supporting the axle 14 for rotation about a substantially horizontal axis. Parallel to the star wheel 13 and spaced horizontally therefrom is a disk 18 which is concentric with the axle 14, though rigidly mounted by bolts 19 on one of the upwardly extending braces 16 to preclude rotational movement thereof. The bolts are secured to the brace by suitable fastening means, as for example nut 20. Mounted on the disk-like member 18 is an arcuate segment portion 21 which is secured by bolts 22 in slots provided in the segment portion so that the latter may be adjustably mounted on the circumference of the disk 18 and forms a cam surface in conjunction with the edge of the disk. The star wheel 13 is comprised of a pair of disk-like portions, each of which is provided with a plurality of openings or apertures 23 that are substantially semicircular and open outwardly along the circumference thereof. The apertures include a flared portion 24 which permits easy removal of a circular or cylindrical embodiment placed in the opening; in this case, the tested cans. Interconnecting the two disk-like portions of star wheel 13 are a plurality of transverse stub shafts 25 pivotally retained adjacent each of the apertures 23 in the star wheel. Each stub shaft has mounted thereon in parallel relationship with the two disk-like portions of star wheel 13 a finger 26 which includes an arcuate portion defined by two extremes 27 and 28. Hereinafter, the elements related to only one of the stub shafts will be discussed, it being understood that all the stub shafts are the same as to structure and operation. Stub shaft 25 extends through the disk-like portions of the star wheel with outwardly projecting ends on either side thereof. On the end of the shaft adjacent disk 18 is a crank 29 which is retained thereon by set screw 30 so that it may be adjusted angularly with respect to the shaft. On the free end of the crank 29 is a roller follower 31 which is adapted to ride along the surface defined by the disk 18 and the arcuate segment portion 21 mounted on disk 18 which defines the cam operation of the present invention, as will hereinafter be explained. On the other end of stub shaft 25 is an additional crank 32 also mounted for angular orientation on the shaft by set screw 33. The free end of crank 32 is provided with an aperture 34 which receives a tension spring 35. The tension spring 35 is mounted on the star wheel 13 at point 36 and biases the finger to a closed or can grasping position as is illustrated in FIGURE 3.

A cam segment 37 is pivotally mounted to the disk 18 at pivot point 38, as is seen in FIGURE 3. Also mounted on the disk is a motor means, as for example a pneumatic cylinder, a hydraulic cylinder, a solenoid or the like. In the preferred embodiment a pneumatic type cylinder 41 is used which includes a piston 40 pivotally connected to the cam segment 37 at pivot point 39. The cam segment is positioned on the disk 18 so that it may be rotated into the path of travel of the roller followers 31 which ride on the cam surface defined by the disk 18 and segment 21. Thus, when the cylinder 41 is energized and piston 40 moves the cam segment into the cam surface path of travel it is seen that the rollers 31 engage the segment as illustrated in FIGURE 1 and swing the fingers 26 to an open position to allow removal of the cans retained in the openings 23.

Figure 5:
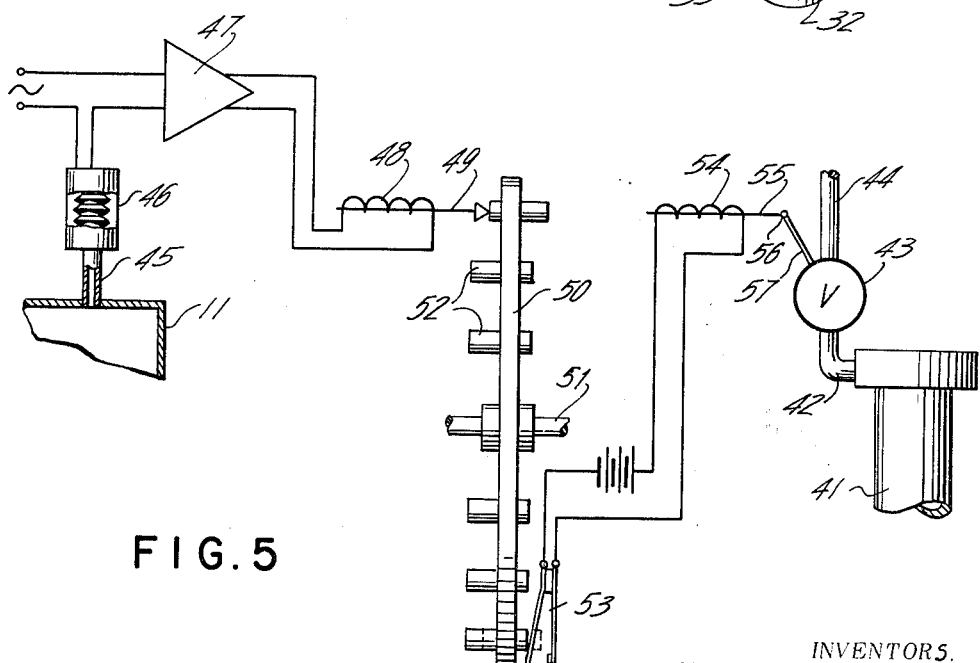
FIGURE 5 is a schematic illustration of the circuit and memory device of the can tester apparatus of the present invention.

Turning now to the schematic illustration of the sensing and recording apparatus in FIGURE 5, there is shown a test chamber 11 into which cans are placed for testing under the influence of a gas media and any leakage which seeps through the walls of the can will escape through conduit 45 to a sensing means. The sensing means may be one of a variety of well-known transducers or the like or any other apparatus which converts pneumatic quantities into electric signals. In the preferred embodiment the sensing means 46 is a conventional bellows microswitch arrangement which operates on the principle that as the bellows are expanded, a microswitch is actuated and a signal is transmitted from the sensing means. The signal is received by amplifier 47 and amplified for use by a solenoid 48 including a piston 49. When a leak is detected and the microswitch is actuated by the expansion of the bellows 46 the solenoid is actuated and piston 49 engages a pin 52 on memory wheel 50. The wheel 50 contains a plurality of such pins 52 and is mounted on axle 51 for rotation in timed relationship with the rotation of the tester wheel 10. Therefore, a pin 52 is always aligned with the piston 49 when one of the cans undergoes its test in the test chamber and in the event that a leaky can is sensed, piston 49 depresses the pin aligned with it to record the leak. During the rotation of the wheel 50, the leaky can is removed from the test chamber 11 and placed in the star wheel 13 where it is conveyed until such time as the aperture in which the leaky can is retained is in alignment with the piston 41, as shown in FIGURES 1 and 3. At that point, the pin 52 previously depressed by the piston 49 engages a microswitch 53 as shown in a schematic illustration of FIGURE 5. The engaged microswitch closes a circuit which energizes solenoid 54 and induces movement of piston 55, the latter being pivotally connected to crank arm 57. The crank arm 57 is mounted for rotation at point 56 and is connected to valve 43 to open and close same to allow gas to pass therethrough. Gas is supplied to the valve 43 from a source (not shown) by conduit 44, and conduit 42 conveys the gas, when valve 43 is open, to cylinder 41. Thus, the piston 40 in cylinder 41 is actuated and the segment portion 37 swings down against the roller 31 to pivot finger 26 and induce release and ejection of the leaky can from the aperture 23 into a reject chute 58 suitably provided therebeneath. It should be noted that portion 28 of the arcuate section of the finger 26 swings into the opened aperture when the latter is rotated and provides an outward thrust to eject the can from the aperture. In the event that no leak is encountered during the test in chamber 11, obviously no electric signal is conveyed to the amplifier 47 and the piston 49 is never induced to remove. In such instance, the pins 52 will not be depressed to actuate the microswitch 53. In the instance of a leak-proof can, the can will continue to be conveyed by the star wheel in retaining finger 26 until the roller 31 engages cam segment 21 mounted on the disk 18, at which time the finger will be rotated and the portion 28 on finger 26 will eject the cans into a separate chute 59 provided for the leak-proof cans.

The arcuate portion 27 of the fingers 26 mounted in each of the apertures on the star wheel positively grasps the can in the aperture between the two disk-like portions of the star wheel and actually engages approximately two-thirds of the circumference of the can in the retained position on the star wheel. This latter feature is most important when dealing with high speed can testers since considerable centrifugal force is imparted to the cans retained in the aperture causing a strong outward force against the finger 26. The sorting apparatus of the present invention is designed to sort cans at a speed of approximately six hundred cans per minute. Moreover, the use of light weight alloys and shorter length cans in today's can testers operating at high rotational speeds increases the need for a positive grasping of the can during the conveyance of same through the sorting apparatus. Finally, the ejection portion 28 on the finger 26 complements the high speed sorting of cans by inducing a positive ejection in a rapid manner of leaky cans from the star wheel into a reject chute.

Although one embodiment of the present invention has been herein illustrated and described, it will be evident to those skilled in the art that various modifications may be incorporated into the details of production without departing from the principles herein set forth.

What is claimed is:
1. Apparatus for sorting leaky cans detected in a can tester comprising conveying means adapted to continuously move cans from said tester, releasable retaining means on said conveying means adapted to retain said cans thereon, ejection means operatively associated with said retaining means to positively expel said can from said conveying means concurrently with release of said releasable retaining means, first actuation means spaced from said tester to release said retaining means whereby leakproof cans are expelled from said conveying means, second actuation means interposed between said first actuation means and said tester, said second actuation means being responsive to signals from said tester to release said releasable retaining means prior to said first actuation means whereby leaky cans are expelled from said conveying means.

2. Apparatus according to claim 1, including a cam means juxtaposed with said conveying means, said releasable retaining means including cam followers in contact with said cam means, said first actuation means being an enlarged portion of said cam whereby said cam followers release said releasable retaining means.

3. Apparatus according to claim 2 wherein said actuation means includes a segment member pivotally secured on said cam means, means responsive to said tester signals for rotating said segment into the path of said cam followers to contact same and effect expulsion of leaky cans.

4. Apparatus according to claim 1 wherein said ejection means includes a finger on said releasable retaining means which contacts and expels said can upon release of said releasable retaining means.

5. In a can-testing apparatus comprising means for supplying cans to said apparatus, means for moving said cans into a testing media, means for supplying gas to said testing media, means for removing said cans from said testing media, means for sensing and recording gas leaks which exist in said cans, means for continuously conveying said cans from said removing means, and releasable retaining means adapted to maintain said cans in spaced relationship on said conveying means, the improvement comprising a cam adjacent said conveying means, said releasable retaining means including a follower operatively engaged with said cam, said cam being radically inconsistent whereby movement of the follower over the length thereof will release said retaining means and eject said cans from said conveying means, a segment member juxtaposed with said cam, means responsive to said sensing and recording means to move said segment into the path of said follower prior to cam actuation whereby said retaining means ejects leaky cans from said conveying means, said segment moving means includes motor means having a piston pivotally secured to said segment member, means to energize said motor means to move said piston, said energizing means being in response to said sensing and recording means whereby said piston is moved to release said retaining means upon detection of a leaky can by said sensing and recording means.

References Cited

UNITED STATES PATENTS

| | | | |
|---|---|---|---|
| 2,232,711 | 2/1941 | Maher | 73—45.2 |
| 2,627,346 | 2/1953 | Stone | 209—74 |
| 2,687,202 | 8/1954 | Nordquist et al. | |
| 2,985,008 | 5/1961 | Renard | 73—45.2 |
| 3,010,310 | 11/1961 | Rowe | 73—45.1 XR |

LOUIS R. PRINCE, Primary Examiner

W. A. HENRY II, Assistant Examiner

U.S. Cl. X.R.

209—74